United States Patent
Nishikawa

(10) Patent No.: US 10,611,223 B2
(45) Date of Patent: Apr. 7, 2020

(54) GLASS RUN FOR AUTOMOBILE DOOR

(71) Applicant: Nishikawa Rubber Co., Ltd., Nishi-ku, Hiroshima-shi, Hiroshima (JP)

(72) Inventor: Shinji Nishikawa, Hiroshima (JP)

(73) Assignee: Nishikawa Rubber Co., Ltd., Hiroshima (JP)

(*) Notice: Subject to any disclaimer, the term of this patent is extended or adjusted under 35 U.S.C. 154(b) by 134 days.

(21) Appl. No.: 15/939,829

(22) Filed: Mar. 29, 2018

(65) Prior Publication Data

US 2018/0313139 A1 Nov. 1, 2018

(30) Foreign Application Priority Data

Apr. 27, 2017 (JP) ................................. 2017-087929

(51) Int. Cl.
| | |
|---|---|
| *B60J 10/76* | (2016.01) |
| *B60J 10/16* | (2016.01) |
| *B60J 10/74* | (2016.01) |
| *B60J 10/79* | (2016.01) |

(52) U.S. Cl.
CPC .............. *B60J 10/76* (2016.02); *B60J 10/16* (2016.02); *B60J 10/74* (2016.02); *B60J 10/79* (2016.02)

(58) Field of Classification Search
CPC ... B60J 10/16; B60J 10/74; B60J 10/76; B60J 10/265; B60J 10/17; B60J 10/50; B60J 5/0402

See application file for complete search history.

(56) References Cited

U.S. PATENT DOCUMENTS

| | | | | |
|---|---|---|---|---|
| 5,317,835 | A * | 6/1994 | Dupuy | B60J 10/235 49/377 |
| 6,435,597 | B1 * | 8/2002 | Anders | B60J 10/79 296/107.01 |
| 7,383,662 | B2 * | 6/2008 | Tamaoki | B60J 10/246 49/428 |
| 9,616,734 | B2 * | 4/2017 | Clark | B60J 5/0402 |
| 2001/0001916 | A1 * | 5/2001 | Nozaki | B60J 10/16 49/414 |
| 2001/0015034 | A1 * | 8/2001 | Omori | B60J 10/16 49/440 |
| 2005/0120633 | A1 * | 6/2005 | Takase | F16J 15/025 49/441 |
| 2006/0248802 | A1 * | 11/2006 | Tamaoki | B60J 10/16 49/441 |
| 2012/0079772 | A1 * | 4/2012 | Mine | B60J 10/76 49/490.1 |
| 2015/0047264 | A1 * | 2/2015 | Kobayashi | E06B 7/2303 49/440 |
| 2017/0136861 | A1 * | 5/2017 | Kojima | B60J 10/76 |
| 2018/0022196 | A1 * | 1/2018 | Masumoto | B60J 10/76 49/428 |

FOREIGN PATENT DOCUMENTS

JP 4048957 B2 2/2008

\* cited by examiner

*Primary Examiner* — Justin B Rephann
(74) *Attorney, Agent, or Firm* — Potomac Law Group, PLLC; Kenneth Fagin

(57) ABSTRACT

An outer side wall includes a bent sealing portion bent so as to be raised toward the inside of a cabin. When a window glass is closed, the bent sealing portion is elastically deformed so as to stretch along the outer surface of the window glass. The outer surface of the bent sealing portion is provided with a soft portion made of a softer material than the outer side wall.

4 Claims, 3 Drawing Sheets

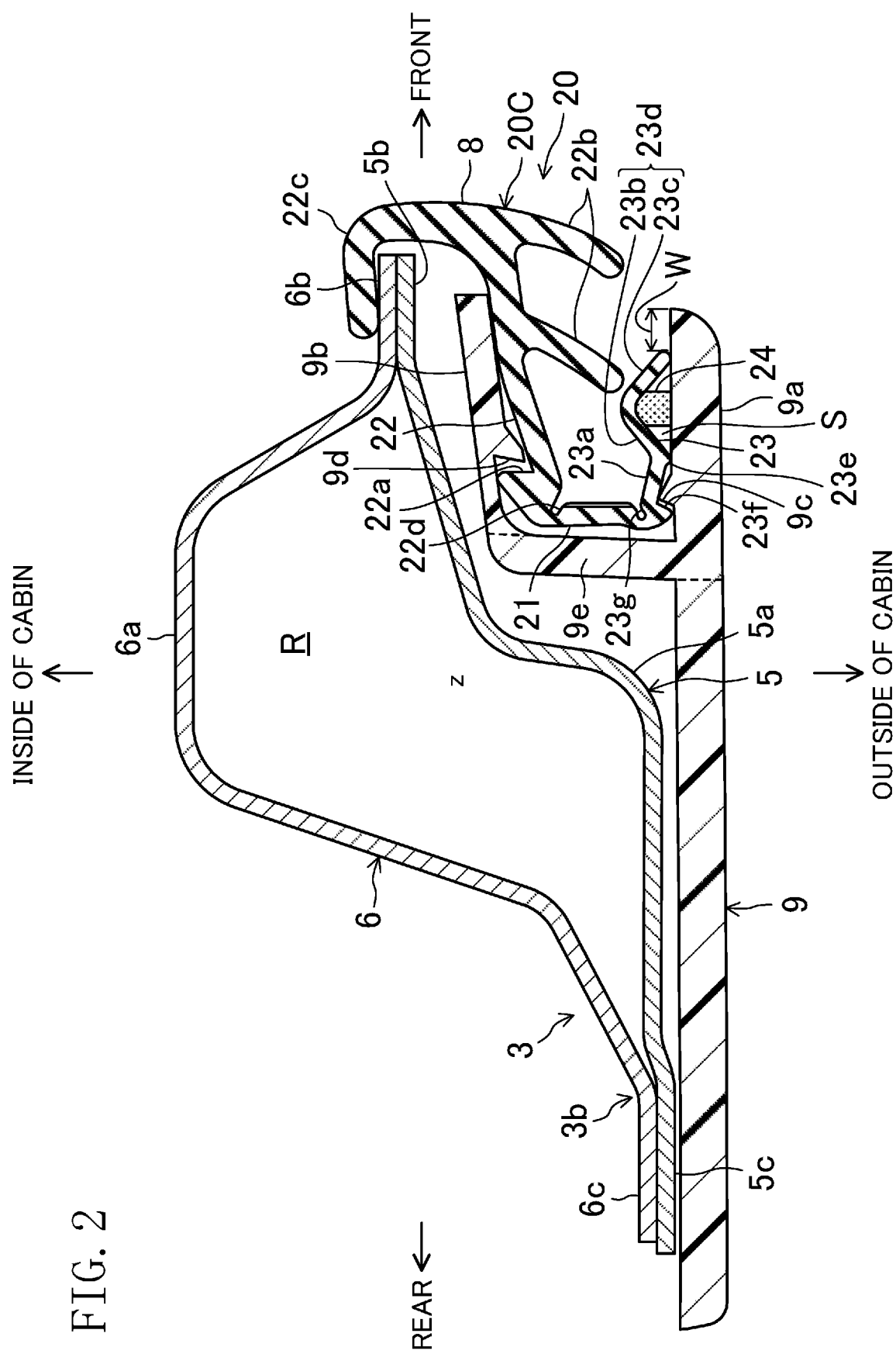

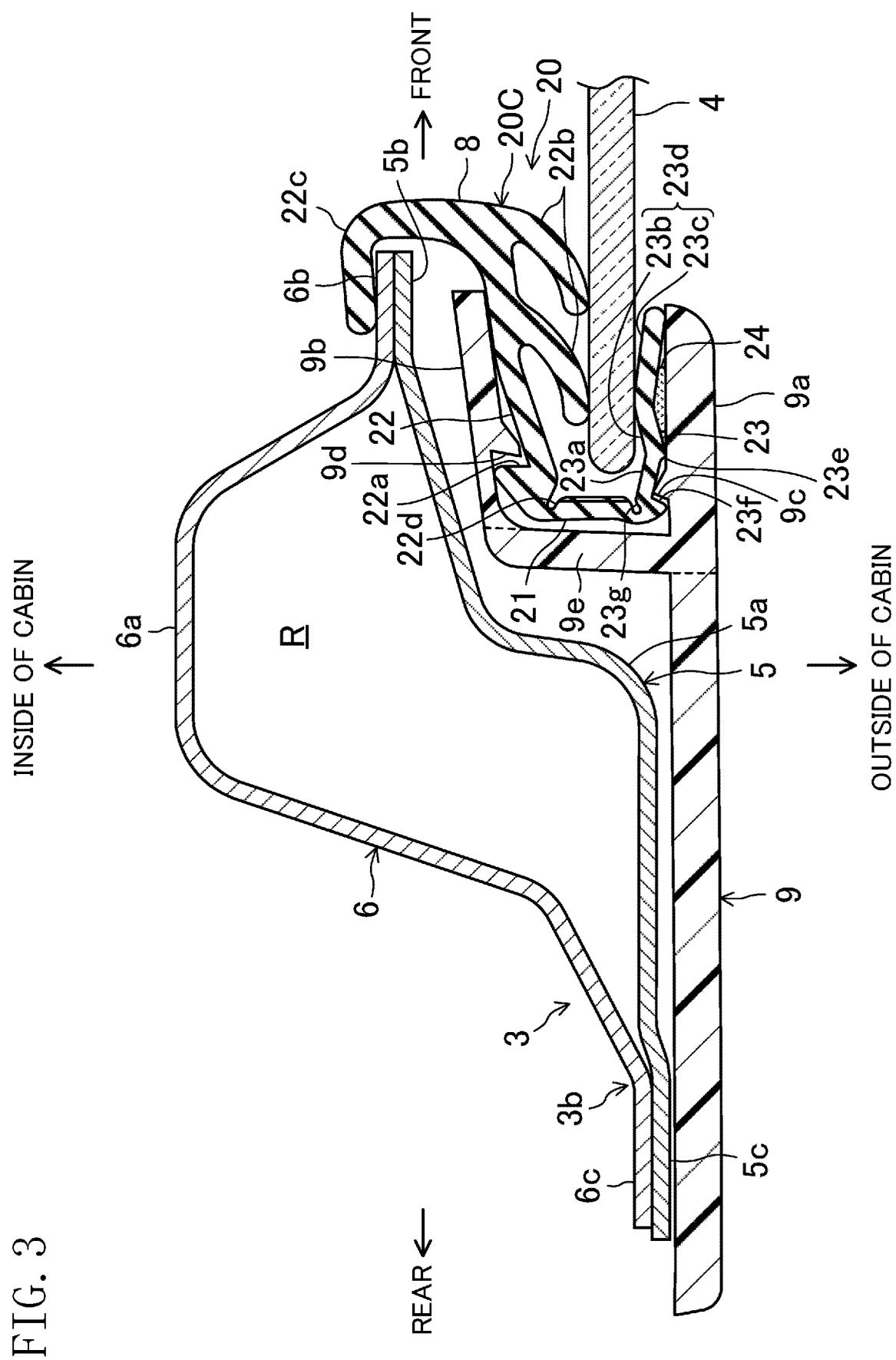

GLASS RUN FOR AUTOMOBILE DOOR

CROSS-REFERENCE TO RELATED APPLICATION

This application claims priority to Japanese Patent Application No. 2017-087929 filed on Apr. 27, 2017, the entire disclosure of which is incorporated by reference herein.

BACKGROUND

The present disclosure relates to a glass run disposed in an automobile door. In particular, the present disclosure relates to a configuration provided with an outer sealing lip contacting the outer surface of a window glass facing the outside of a cabin.

In general, there are various types of automobile side doors, one of which has a window frame (also called a sash) holding a peripheral portion of a window glass. A door having such a window frame is provided with a glass run for sealing a gap between the window frame and the window glass.

Japanese Patent No. 4048957 discloses a glass run including a base, a vehicle inner sealing lip (hereinafter referred to as "the inner sealing lip"), and a vehicle outer sealing lip (hereinafter referred to as "the outer sealing lip"). The base is fixed to a window frame. The inner sealing lip protrudes from a portion of the base closer to the cabin, and makes contact with the inner surface of the window glass facing the inside of the cabin (hereinafter referred to as "the inner surface of the window glass"). The outer sealing lip protrudes from a portion of the base farther from the cabin, and makes contact with the outer surface of the window glass facing the outside of the cabin (hereinafter referred to as "the outer surface of the window glass"). The outer sealing lip is formed as a whole so as to be bent in the inward-outward direction of the cabin. The outer sealing lip includes base, middle, and tip portions. The base portion extends obliquely from the base toward the inside of the cabin. The middle portion extends obliquely toward the outside of the cabin from the end of the base portion. The tip portion protrudes from the end of the middle portion.

In Japanese Patent No. 4048957, when the window glass is closed, the window glass is interposed between the inner and outer sealing lips of the glass run to come into contact with the inner and outer sealing lips. In this state, the outer surface of the window glass presses the outer sealing lip, and the base and middle portions are elastically deformed along the outer surface of the window glass to reduce its dimension in the inward-outward direction of the cabin. This reduces a step difference between the outer surface of the window glass and the outer surface of the window frame facing the outside of the cabin (hereinafter referred to as "the outer surface of the window frame").

SUMMARY

Just like Japanese Patent No. 4048957, when a window glass is closed, an outer sealing lip, which has been bent in advance in the inward-outward direction of the cabin, is elastically deformed along the outer surface of the window glass, thereby making it possible to reduce the step difference between the outer surface of the window glass and the outer surface of a window frame. This makes these surfaces substantially flush with each other to reduce wind noise.

However, when the window glass is closed, the outer sealing lip stretches to the maximum extent along the outer surface of the window glass. As a result, the tip portion of the outer sealing lip comes out from the window frame, and appearance may be deteriorated.

In Japanese Patent No. 4048957, even if the window glass is closed, the outer sealing lip remains bent, and a gap is inevitably formed between the outer surface of the outer sealing lip and the inner surface of the window frame (hereinafter referred to as "the inner surface of the window frame"). Due to this gap, in a situation where the window glass is excited and vibrates in a width direction of the vehicle during, e.g., running of the vehicle, the outer surface of the outer sealing lip and the inner surface of the window frame may cause rattle noise when they abut on each other, or make sound when they come into contact with, or separate from, each other (hereinafter referred to as "contact/separation sound"). The window glass is located near ears of passengers, and thus, if the rattle noise or the contact/separation sound is made, such sound is easily heard by the passengers even if the sound is small, which tends to be a problem.

The present disclosure is conceived in view of the above problems, and attempts to reduce a step difference between the outer surface of a window glass and the outer surface of a window frame to provide much less stepped surfaces, and to reduce the possibility that a sealing lip rattles or makes contact/separation sound.

In order to achieve the above attempts, the present disclosure provides a technique of allowing an outer sealing lip to include a bent sealing portion, and providing a soft portion between the bent sealing portion and the inner surface of the window frame.

A first aspect of the present disclosure relates to a glass run for an automobile door, the glass run being attached to a window frame supporting a peripheral portion of a window glass which is movable up and down and disposed in the automobile door, and the glass run sealing a gap between the window frame and the window glass, wherein the glass run includes: a base; an inner side wall closer to a cabin and extending from an inner portion of the base; an inner sealing lip closer to the cabin, extending from the inner side wall to be in contact with an inner surface of the window glass; and an outer side wall farther from the cabin and extending from an outer portion of the base, the outer side wall including a bent sealing portion that is bent and raised toward an inside of the cabin, and is in contact with an outer surface of the window glass, when the window glass is closed, the bent sealing portion is pressed toward an outside of the cabin by the outer surface of the window glass and is elastically deformed so as to stretch along the outer surface of the window glass, and a soft portion is provided between an outer surface of the bent sealing portion farther from the cabin, and an inner surface of the window frame facing the outer surface of the bent sealing portion, the soft portion being made of a softer material than the outer side wall.

According to this configuration, when the window glass is closed, the inner sealing lip makes contact with the inner surface of the window glass, and the bent sealing portion makes contact with the outer surface of the window glass, thereby sealing the gap between the window frame and the window glass. The bent sealing portion of the outer side wall is pressed toward the outside of the cabin by the outer surface of the window glass, and is elastically deformed so as to extend along the outer surface of the window glass. This reduces the dimension of the outer side wall in the inward-outward direction of the cabin. As a result, the step difference between the outer surface of the window glass and the outer surface of the window frame is made smaller, thereby making it possible to provide less stepped surfaces.

At that time, the soft portion is interposed between the outer surface of the bent sealing portion and the inner surface of the window frame. This can prevent the outer sealing lip from stretching to the maximum extent. This allows the tip end portion of the outer sealing lip to hardly come out from a glass run mount of a garnish attached to the window frame. As a result, excellent appearance can be maintained.

If the window glass is excited and vibrates in the width direction of the vehicle during, e.g., running of the vehicle, the outer surface of the outer side wall does not directly abut on the inner surface of the window frame since the soft portion is interposed between the outer surface of the bent sealing portion and the inner surface of the window frame. As a result, rattle noise and contact/separation sound are hardly generated.

A second aspect of the present disclosure is an embodiment of the first aspect. In the second aspect, the soft portion is provided to the outer surface of the bent sealing portion.

According to this configuration, the soft portion and the bent sealing portion are integrated together. Thus, attaching the glass run to the window frame allows the soft portion to be disposed in a predetermined position. In addition, this can reduce positional displacement of the soft portion.

A third aspect of the present disclosure is an embodiment of the first aspect. In the third aspect, the soft portion is provided to a middle portion of the outer surface of the bent sealing portion except a tip end portion of the bent sealing portion.

According to this configuration, the soft portion does not exist in the tip end portion of the bent sealing portion. Thus, when the bent sealing portion is pressed toward the outside of the cabin by the outer surface of the window glass, and the soft portion is deformed, the soft portion does not come out from the gap between the tip end portion of the outer side wall and the window glass.

A fourth aspect of the present disclosure is an embodiment of the first aspect. In the fourth aspect, the soft portion is provided to a portion of the outer surface of the bent sealing portion except a base end portion of the bent sealing portion.

According to this configuration, the soft portion does not exist in the base end portion of the bent sealing portion. Thus, a space allowing for deformation of the soft portion can be provided near the base end portion of the bent sealing portion. As a result, when the bent sealing portion is pressed toward the outside of the cabin by the outer surface of the window glass, and the soft portion is deformed, the soft portion can be deformed with almost no interference.

A fifth aspect of the present disclosure is an embodiment of the first aspect. In the fifth aspect, when the window glass is opened, the soft portion is in contact with both the outer surface of the bent sealing portion and the inner surface of the window frame facing the outer surface of the bent sealing portion.

This configuration allows the soft portion to be in contact with both the outer surface of the bent sealing portion and the inner surface of the window frame in advance. As a result, contact/separation sound is more hardly generated.

A sixth aspect of the present disclosure is an embodiment of the first aspect. In the sixth aspect, the soft portion is comprised of an elastic material which presses the bent sealing portion inward from the outside of the cabin when the bent sealing portion is elastically deformed by the window glass that is in a closed state.

According to this configuration, when the window glass is closed, the soft portion presses the bent sealing portion inward from the outside of the cabin. This can further enhance sealing between the outer side wall and the window glass.

According to the first aspect of the present disclosure, the outer side wall is provided with the bent sealing portion, and the outer surface of the window glass in the closed state presses the bent sealing portion toward the outside of the cabin. This can provide much less stepped surfaces. Also, the soft portion can be interposed between the outer surface of the bent sealing portion and the inner surface of the window frame. This allows the tip end portion of the outside side wall to hardly come out from the front end of the glass run mount of the garnish attached to the window frame to improve appearance. In addition, rattle noise and contact/separation sound can be hardly generated.

The second aspect of the present disclosure allows the soft portion to be integrated with the bent sealing portion. This can facilitate arrangement of the soft portion in a predetermined position, and reduce the positional displacement of the soft portion. As a result, the advantage of the soft portion can be obtained significantly.

According to the third aspect of the present disclosure, the soft portion is formed in the middle portion of the outer surface of the bent sealing portion except the tip end portion of the bent sealing portion. Therefore, when the bent sealing portion is pressed toward the outside of the cabin by the outer surface of the window glass, and the soft portion is deformed, the soft portion does not come out from the gap between the tip end portion of the outer side wall and the window glass. This can avoid deterioration of appearance.

According to the fourth aspect of the present disclosure, the soft portion does not exist in the base end portion of the bent sealing portion of the outer side wall. Thus, the soft portion can be deformed with almost no interference.

The fifth aspect of the present disclosure allows the soft portion to be in contact with both the outer surface of the bent sealing portion and the inner surface of the window frame in advance. As a result, hitting sound and contact/separation sound can be more hardly generated.

The sixth aspect of the present disclosure allows the soft portion to press the bent sealing portion of the outer side wall inward from the outside of the cabin. This can further enhance the sealing performance.

BRIEF DESCRIPTION OF THE DRAWINGS

FIG. 2 is a cross-sectional view taken along line II-II of FIG. 1 when a window glass is opened.

FIG. 3 is a view corresponding to FIG. 2 when the window glass is closed.

DETAILED DESCRIPTION

Figure 1:
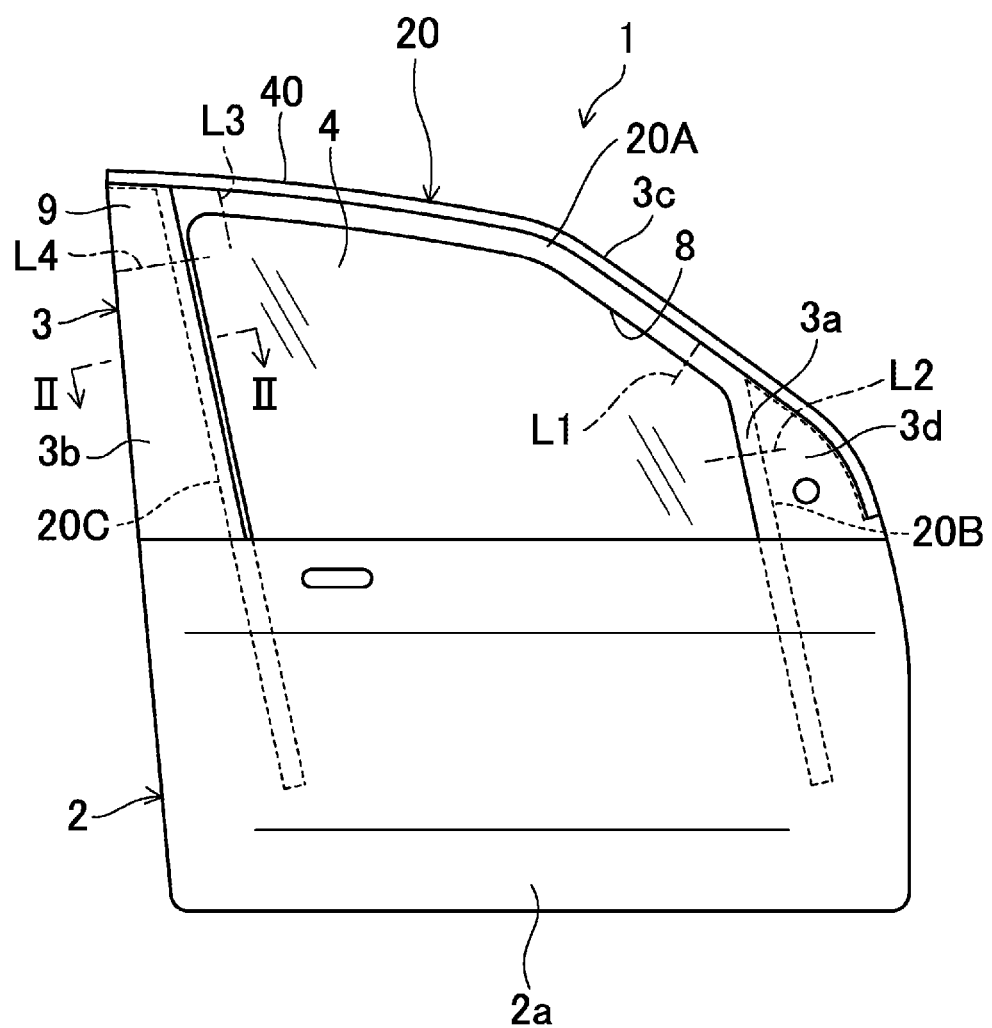
FIG. 1 is a view of a right door of an automobile including a glass run for the automobile door according to an embodiment as observed from the outside of a cabin.

Embodiments of the present disclosure will now be described in detail with reference to the drawings. The following description of advantageous embodiments is only an example in nature, and is not intended to limit the scope, application, or uses of the present disclosure.

FIG. 1 is a side view of an automobile right door 1 including an automobile door glass run 20 as observed from the outside of a cabin. This automobile right door 1 is a front door arranged near the front of an automobile (not shown)

on each side of the automobile, and covers or uncovers an opening (not shown) formed through each side of the automobile near the front of the automobile. Although not shown, if a rear door is arranged on each side of the automobile, the present disclosure is also applicable to a glass run attached to the rear door.

In the description of this embodiment, the side closer to the front of the vehicle is simply referred to as "front," and the side closer to the rear of the vehicle is simply referred to as "rear."

The automobile door 1 includes a door body 2 comprising almost lower half of the automobile body 1, and a window frame 3 comprising almost upper half of the automobile body 1. Although not shown, a front end of the door body 2 is attached to a pillar of an automobile body via hinges pivoting about an axis extending in a vertical direction. The door body 2 includes an inner panel (not shown) and an outer panel 2a which are made of a steel sheet or any other suitable material, and is configured to house a window glass 4 which is movable up and down, and a lifting apparatus (not shown) which allows the window glass 4 to move up and down.

The window frame 3 functions as a sash holding a peripheral portion of the window glass 4, and extends to define a window opening 8. The window glass 4 is configured to cover or uncover the window opening 8 defined by the window frame 3. The window frame 3 of this embodiment is comprised of a combination of an outer panel 5 and an inner panel 6, both of which are press-formed from a steel sheet or any other suitable material, as shown in FIG. 2. Note that the window frame 3 may be obtained by, for example, roll forming.

As illustrated in FIG. 1, the window frame 3 is comprised of a front frame portion 3a, a rear frame portion 3b, and an upper frame portion 3c. The front frame portion 3a protrudes upward from a front portion of an upper edge of the door body 2. The rear frame portion 3b extends upward from a rear portion of the upper edge of the door body 2. The rear frame portion 3b extends to be taller than the front frame portion 3a. The upper frame portion 3c extends in a front-rear direction of the vehicle from an upper end of the front frame portion 3a to an upper end of the rear frame portion 3b along a side edge of a roof (not shown) of the automobile body. The shape of the upper frame portion 3c is not limited to the illustrated one. Alternatively, the upper frame portion 3c may be entirely curved upward, or may have a curved portion suitably positioned, or an inclination angle suitably determined, in association with the roof shape of the automobile body.

A door mirror mount 3d to which a door mirror (not shown) is attached is provided forward of the front frame portion 3a of the window frame 3. The door mirror mount 3d has an upper edge portion continuous with the front end portion of the upper frame portion 3c of the window frame 3.

As shown in FIG. 2, the outer panel 5 and the inner panel 6 constituting the window frame 3 are configured to define a hollow portion R inside the window frame 3. The outer panel 5 is a plate member constituting an outer portion of the window frame 3 farther from the cabin. The inner panel 6 is a plate member constituting an inner portion of the window frame 3 closer to the cabin. The outer panel 5 has, at a middle portion thereof, a bulge 5a which bulges in the direction away from the inner panel 6. The outer panel 5 has a bonding plate portion 5b at an end closer to the window opening 8. The outer panel 5 has a bonding plate portion 5c at an end away from the window opening 8.

The inner panel 6 has, at a middle portion thereof, a bulge 6a which bulges toward the inside of the cabin. The inner panel 6 has a bonding plate portion 6b at an end closer to the window opening 8. The inner panel 6 has a bonding plate portion 6c at an end away from the window opening 8.

The bonding plate portion 5b of the outer panel 5 and the bonding plate portion 6b of the inner panel 6 are stacked and bonded together. The bonding plate portion 5c of the outer panel 5 and the bonding plate portion 6c of the inner panel 6 are stacked and bonded together. As a result, the outer panel 5 and the inner panel 6 are integrated with each other. The bulge 5a of the outer panel 5 and the bulge 6a of the inner panel 6 define the hollow portion R inside the window frame 3.

In this embodiment, as shown in FIG. 1, the window frame 3 includes a garnish 9. The garnish 9 is a part of the window frame 3, and is made of a rigid resin material as a whole. The garnish 9 is a decorative member covering the outer panel 5 forming the rear frame portion 3b of the window frame 3 from the outside of the cabin, and extends vertically along the rear frame portion 3b.

As shown in FIG. 2, the rear end of the garnish 9 is disposed behind the rear frame portion 3b of the window frame 3. The front of the garnish 9 is provided with a glass run mount 9a on which a glass run 20 is mounted. The glass run mount 9a extends forward. The inner surface, closer to the cabin, of the front portion of the garnish 9 (hereinafter referred to as "the inner surface of the front portion of the garnish 9") is provided with an inner plate portion 9b located inside, and spaced apart from, the glass run mount 9a. The inner plate portion 9b is spaced apart from the glass run mount 9a in the inward-outward direction of the cabin. Also, a connecting portion 9e is provided so as to extend from the rear end of the inner plate portion 9b toward the glass run mount 9a, and couple the inner plate portion 9b to the glass run mount 9a. The glass run 20 is inserted into a forwardly opening recess defined by the glass run mount 9a, the inner plate portion 9b, and the connecting portion 9e, thereby being attached to the garnish 9. The front end of the glass run mount 9a is substantially the same level with the front end of the inner plate portion 9b in the front-rear direction. The inner plate portion 9b is gently tilted relative to the front-rear direction so as to be away from the inner surface of the glass run mount 9a facing the inside of the cabin (hereinafter referred to as "the inner surface of the glass run mount 9a") toward the front.

The inner surface of the glass run mount 9a is provided with an outward protrusion 9c protruding toward the inside of the cabin. The outward protrusion 9c is disposed at a rear portion of the glass run mount 9a, i.e., behind the middle portion of the glass run mount 9a in the front-rear direction. The rear surface of the outward protrusion 9c is tilted greater than the front surface thereof relative to the front-rear direction of the vehicle. The outer surface of the inner plate portion 9b facing the outside of the cabin (hereinafter referred to as "the outer surface of the inner plate portion 9b") is provided with an inward protrusion 9d protruding toward the outside of the cabin. The inward protrusion 9d is located forward of the outward protrusion 9c. The rear surface of the inward protrusion 9d is tilted greater than the front surface thereof relative to the front-rear direction of the vehicle.

Although not shown, the garnish 9 is fixed to the rear frame portion 3b of the window frame 3 using a fixing member such as a screw or bolt to be integrated with the rear frame portion 3b. That is to way, the glass run 20 is attached to the garnish 9, thereby being attached to the window frame 3.

In this embodiment, the glass run 20 is attached to the garnish 9 disposed in the portion, outside the cabin, of the rear frame portion 3b of the window frame 3. Alternatively, the rear frame portion 3b may be provided with a forwardly opening recess (not shown), and then, the glass run 20 may be attached to this recess (glass run mounting recess) of the rear frame portion 3b.

(Configuration for Glass Run)

An upper glass run (upper portion) 20A of the glass run 20 is a so-called "hiding type" glass run which covers at least the outer portion of the upper frame portion 3c. The upper glass run 20A is assembled to the upper frame portion 3c from the outside of the cabin, and functions as a seal which seals a gap between the window frame 3 and the window glass 4.

The glass run 20 is comprised of a combination of an extrusion-molded portion and a die-molded portion which is molded in a molding die. As shown in FIG. 1, a portion around the boundary between the upper glass run 20A and a front glass run (front longitudinal portion) 20B of the glass run 20, i.e., a portion between boundary lines L1 and L2 (indicated by dash-and-dot lines), is a die-molded portion. Further, a portion around the boundary between the upper glass run 20A and a rear glass run (rear longitudinal portion) 20C of the glass run 20, i.e., a portion between boundary lines L3 and L4 (indicated by dash-and-dot lines) is a die-molded portion. Other portions of the glass run 20 are extrusion-molded.

The upper glass run 20A of the glass run 20 extends along the upper frame portion 3c of the window frame 3. The front glass run 20B extends vertically along the front frame portion 3a of the window frame 3, and the lower end of the front glass run 20B reaches the inside of the door body 2. The rear glass run 20C extends vertically along the rear frame portion 3b of the window frame 3, and the lower end of the rear glass run 20C reaches the inside of the door body 2.

The upper glass run 20A of the glass run 20 is provided with a trim strip 40, which is not shown, from the outside of the cabin. The trim strip 40 is made of, e.g., a metal or a rigid resin material, and extends along the upper glass run 20A in the front-rear direction. Alternatively, no trim strip 40 may be attached.

As shown in FIG. 2, the rear glass run 20C of the glass run 20 includes a base 21, an inner side wall 22 closer to the cabin, two inner sealing lips 22b, and an outer side wall 23 farther from the cabin, the outer side wall 23 including a bent sealing portion 23d. The inner side wall 22 extends forward from an inner portion of the base 21 closer to the cabin along the inner plate portion 9b. The two inner sealing lips 22b extend from the inner side wall 22 to make contact with the inner surface of the window glass 4. The outer side wall 23 extends forward from an outer portion of the base 21 farther from the cabin along the glass run mount 9a. The bent sealing portion 23d is provided as a part of the outer side wall 23, and makes contact with the outer surface of the window glass 4. The base 21, the inner side wall 22, the two inner sealing lips 22b, and the outer side wall 23 are integrally molded. Non-limiting examples of the material for the glass run 20 include elastic materials such as ethylene-propylene-diene rubber (EPDM) and thermoplastic elastomer olefin (TPO). This elastic material may be in a foamed state, or in a solid state with no bubbles.

The base 21 is inserted into a forwardly opening recess defined by the glass run mount 9a, inner plate portion 9b, and connecting portion 9e of the garnish 9 so as to be fixed to the garnish 9. The base 21 is a bottom extending in the inward-outward direction of the cabin. The inner side wall 22 extends forward along the inner plate portion 9b of the garnish 9. The front end of the inner side wall 22 is disposed forward of the front end of the inner plate portion 9b of the garnish 9. The inner surface of the inner side wall 22 closer to the cabin is provided with an inner engaging recess 22a engaging with the inward protrusion 9d of the inner plate portion 9b. The inward protrusion 9d is fitted into the inner engaging recess 22a, so that they engage with each other. In a situation where the inward protrusion 9d engages with the inner engaging recess 22a, the rear surface of the inward protrusion 9d is tilted greater than the front surface thereof. Thus, when a force that tries to relatively move the inner side wall 22 forward is applied to the inner side wall 22, the inward protrusion 9d hardly disengages from the inner engaging recess 22a.

The inner sealing lips 22b are formed in the outer surface of the inner side wall 22 farther from the cabin, i.e., at the front end thereof and the middle portion thereof in the front-rear direction of the vehicle. The inner sealing lips 22b protrude toward the outside of the cabin, and extend further rearward as it goes further toward the outside of the cabin. When the window glass 4 is closed, the inner sealing lips 22b come into contact with the inner surface of the window glass 4, and are pressed toward the inside of the cabin to be deformed. This provides sealing between the inner surface of the window glass 4 and the inner side wall 22.

The front end of the inner side wall 22 is provided with a cover lip 22c covering the bonding plate portion 5b of the outer panel 5 and the bonding plate portion 6b of the inner panel 6 from the front thereof and the inner side of the cabin. The cover lip 22c extends from the front end of the inner side wall 22 toward the inside of the cabin, and is further bent and extends rearward. The cover lip 22c comes into contact and engages with the bonding plate portion 6b of the inner panel 6 in the inside of the cabin.

The rear end (base end) of the inner side wall 22 is provided with an inner recess 22d. The inner recess 22d is disposed near the boundary between the inner side wall 22 and the base 21. The formation of the inner recess 22d can facilitate change of the angle formed by the inner side wall 22 and the base 21 without difficulty, thereby making it possible to improve ease of assembly.

The outer side wall 23 extends forward as a whole in a portion, closer to the cabin, of the glass run mount 9a of the garnish 9. When the window glass 4 is opened, the front end of the outer side wall 23 is present behind the front end of the glass run mount 9a of the garnish 9.

The outer side wall 23 includes a base portion 23a, a middle portion 23b, and a tip portion 23c. The base portion 23a is the rear end (base end) of the outer side wall 23. The base portion 23a protrudes forward from the outer portion of the base 21 of the glass run 20, and extends obliquely so as to be farther from the cabin as it goes further toward the front.

The middle portion 23b is the middle portion of the outer side wall 23 in the front-rear direction of the vehicle. The middle portion 23b protrudes forward from the front end of the base portion 23a, and extends obliquely so as to be closer to the inside of the cabin as it goes further toward the front. When the window glass 4 is opened, the middle portion 23b is tilted greater than the base portion 23a relative to the front-rear direction of the vehicle. This allows the front end of the middle portion 23b to be disposed inside of the rear end of the base portion 23a.

The tip portion 23c is the front end (tip end) of the outer side wall 23. The tip portion 23c protrudes forward from the front end of the middle portion 23b, and extends obliquely so as to be farther from the cabin as it goes further toward the front. When the window glass 4 is open, the tip portion 23c is tilted greater than the base portion 23a relative to the front-rear direction of the vehicle. The front end of the tip portion 23c is in contact with the inner surface of the glass run mount 9a of the garnish 9. When the window glass 4 is opened, the front end of the tip portion 23c is disposed behind the glass run mount 9a of the garnish 9 by a predetermined distance W.

The middle portion 23b and the tip portion 23c constitute the bent sealing portion 23d bent and raised toward the inside of the cabin. The boundary between the middle portion 23b and the tip portion 23c in the bent sealing portion 23d is curved, and the curvature of the curve may be determined freely. As shown in FIG. 3, while the window glass 4 is closed, the bent sealing portion 23d is pressed toward the outside of the cabin by the outer surface of the window glass 4, and is elastically deformed so as to extend along the outer surface of the window glass 4. This elastic deformation reduces the angle of the middle portion 23b relative to the front-rear direction of the vehicle, and also reduces the angle of the tip portion 23c relative to the front-rear direction of the vehicle. Thus, the front end of the tip portion 23c is displaced further forward than in the case where the window glass 4 is opened (shown in FIG. 2). Even if the front end of the tip portion 23c is displaced in the foremost position, the predetermined distance W is set such that the front end of the tip portion 23c is in the same position as or behind the front end of the glass run mount 9a of the garnish 9. As can be seen, the predetermined direction distance W is set, so that the front end of the outer side wall 23 is hardly viewed from the outside of the cabin even when the window glass 4 is closed. This may improve appearance.

The outer surface of the outer side wall 23 facing the outside of the cabin is provided with an outer engaging recess 23f engaging with the outward protrusion 9c of the glass run mount 9b. The outer engaging recess 23f is behind the bent sealing portion 23d. The outward protrusion 9c is fitted into the outer engaging recess 23f, so that they engage with each other. In a situation where the outward protrusion 9c engages with the outer engaging recess 23f, the rear surface of the outward protrusion 9c is tilted greater than the front surface thereof. Thus, when a force that tries to relatively move the outer side wall 23 forward is applied to the outer side wall 23, the outward protrusion 9c hardly disengages from the outer engaging recess 23f.

The rear end (base end) of the outer side wall 23 is provided with an inner recess 23g. The inner recess 23g is disposed near the boundary between the outer side wall 23 and the base 21. The formation of the outer recess 23g can facilitate change of the angle formed between the outer side wall 23 and the base 21 without difficulty, thereby making it possible to improve ease of assembly.

A soft portion 24 is provided between the outer surface of the bent sealing portion 23d farther from the cabin, and the inner surface of the glass run mount 9a of the garnish 9 facing the outer surface of the bent sealing portion 23d. The soft portion 24 is made of a softer material than the outer side wall 23. The inner surface of the glass run mount 9a of the garnish 9 is the outer surface of the window frame 3 since the garnish 9 is a part of the window frame 3. The material of the soft portion 24 may be an elastic material such as EPDM or TPO. The material of the soft portion 24 is preferably made softer than the material of the outer side wall 23 by, e.g., improving its foaming rate.

The soft portion 24 is preferably a foam material having a specific gravity between 0.05 and 0.4, for example. However, the soft portion 24 does not have to be a foam material as long as it is sufficiently soft. For example, it may be a TPO solid material (a material with no bubbles) of JIS K 6253, Type A, with a durometer hardness of 10 to 30.

The soft portion 24 is provided to the outer surface of the bent sealing portion 23d of the outer side wall 23. The soft portion 24 may be provided on the outer surface of the bent sealing portion 23d by integral extrusion molding, or by heat welding, or by adhesion using, e.g., an adhesive agent or a double-sided tape. This allows the soft portion 24 to be integrated with the outer side wall 23, and thus, attaching the glass run 20 allows the soft portion 24 to be disposed in a predetermined position. This can also reduce the positional displacement of the soft portion 24. The soft portion 24 may be disposed directly on the inner surface of the glass run mount 9a of the garnish 9. However, in view of the ease of assembly of the glass run 20, the soft portion 24 may be provided on the outer surface of the bent sealing portion 23d of the outer side wall 23.

The soft portion 24 is formed in a middle portion of the outer surface of the bent sealing portion 23d of the outer side wall 23 except a tip end portion of the bent sealing portion 23d. That is, the soft portion 24 does not exist in the tip end portion of the bent sealing portion 23d. Thus, when the bent sealing portion 23d is pressed toward the outside of the cabin by the outer surface of the window glass 4 to deform the soft portion 24, the soft portion 24 does not come out from the gap between the tip end portion of the outer side wall 23 and the window glass 4. Therefore, excellent appearance can be maintained.

The soft portion 24 is provided to a portion of the outer surface of the bent sealing portion 23d of the outer side wall 23, except a base end portion of the bent sealing portion 23d. That is, the soft portion 24 does not exist in the base end portion of the bent sealing portion 23d. Thus, a space S (shown in FIG. 2) in which the deformation of the soft portion 24 is allowed can be formed near the base end portion of the bent sealing portion 23d. Therefore, when the bent sealing portion 23d is pressed toward the outside of the cabin by the outer surface of the window glass 4 to deform the soft portion 24, the soft portion 24 can be deformed with almost no interference.

The dimension of the soft portion 24 in the inward-outward direction of the cabin is determined such that, when the window glass 4 is opened as shown in FIG. 2, the soft portion 24 comes into contact with both the outer surface of the bent sealing portion 23d and the inner surface of the glass run mount 9a of the garnish 9.

Further, as shown in FIG. 3, the soft portion 24 has an elasticity enough to press the bent sealing portion 23d inward from the outside of the cabin when the bent sealing portion 23d is elastically deformed by the window glass 4 in the closed state. This can further enhance the sealing between the outer side wall 23 and the window glass 4.

Advantages of Embodiment

According to this embodiment, when the window glass 4 is closed as shown in FIG. 3, the inner sealing lip 22b and the bent sealing portion 23d respectively come into contact with the inner and outer surfaces of the window glass 4 to seal the gap between the window frame 3 and the window glass 4. The bent sealing portion 23*d* of the outer side wall 23 is pressed toward the outside of the cabin by the outer surface of the window glass 4, and is elastically deformed so as to extend along the outer surface of the window glass 4. This reduces the dimension of the outer side wall 23 in the inward-outward direction of the cabin. As a result, the step difference between the outer surface of the window glass 4 and the outer surface of the window frame 3 is made smaller, thereby making it possible to provide less stepped surfaces.

At that time, the soft portion 24 is interposed between the outer surface of the bent sealing portion 23*d* and the inner surface of the glass run mount 9*a* of the garnish 9. This can prevent the outer side wall 23 from stretching to the maximum extent. This allows the tip end portion of the outer side wall 23 to hardly protrude from the front end of the glass run mount 9*a* of the garnish 9. As a result, excellent appearance can be maintained.

If the window glass 4 is excited and vibrates in the width direction of the vehicle during, e.g., running of the vehicle, the outer surface of the outer side wall 23 does not directly abut on the inner surface of the window frame 3 since the soft portion 24 is interposed between the outer surface of the bent sealing portion 23*d* and the inner surface of the glass run mount 9*a* of the garnish 9. As a result, rattle noise and contact/separation sound are hardly generated.

Other Embodiments

The shape of the soft portion 24 is not limited to what is shown in the drawings. The soft portion 24 may include a plurality of soft portions 24.

The garnish 9 may be omitted. In this case, the window frame 3 may be provided with a recess or groove for attaching the glass run 20 thereto.

The embodiments described above are mere examples in every respect, and shall not be interpreted in a limited manner. Furthermore, any modification and change equivalent to the scope of claims fall within the scope of the present disclosure.

In view of the foregoing description, a glass run for an automobile door according to the present disclosure can be usefully assembled to a garnish or a window frame.

What is claimed is:

1. A glass run for an automobile door with a window glass that is movable up and down and that is disposed in the automobile door, the glass run 1) being configured to be attached to a predetermined glass run mount that is formed along a vertically extending portion of a window frame that supports a peripheral portion of the window glass when the window glass is in a closed position within the automobile door, and 2) the glass run being configured to seal a gap between the vertically extending portion of the window frame and the window glass when the window glass is in a closed position within the window opening, wherein the glass run includes a longitudinal portion that is configured to be inserted into a forwardly opening, vertically extending recess that is formed along the glass run mount, the longitudinal portion including:

a base;

an inner side wall extending from an inner portion of the base; and an outer side wall including 1) a base portion extending from an outer portion of the base and 2) a bent sealing portion, the bent sealing portion being bent and raised toward the inner side wall, the inner side wall and the outer side wall both extending from respective portions of the base in a fore-aft direction relative to the automobile, with the outer side wall being located farther away from a cabin of the automobile than the inner side wall is when the longitudinal portion is inserted into the forwardly opening, vertically extending recess of the glass run mount, the longitudinal portion further including an inner sealing lip extending from an exterior-facing surface of the inner side wall and being configured and arranged to be in contact with an interior surface of the window glass when the longitudinal portion is inserted into the forwardly opening, vertically extending recess of the glass run mount and the window glass is in the closed position within the window opening; and a soft portion attached to and extending along a middle portion of an exterior-facing surface of the bent sealing portion except for a tip portion thereof, the elastomeric soft portion being made from a material that is softer than the material from which the outer side wall of the longitudinal portion is made; the configuration and arrangement of the bent sealing portion being such that when the window glass is closed, the bent sealing portion is pressed toward an outboard wall of the forwardly opening, vertically extending recess by an exterior surface of the window glass and is elastically deformed so as to stretch along the exterior surface of the window glass, the length of the bent sealing portion in the fore-aft direction relative to the automobile being predetermined so that a tip-end portion of the bent sealing portion does not extend past a free edge of the outboard wall of the glass run mount even after maximum deflection of the bent sealing portion, wherein an outer surface of the base portion is provided with an outer engaging recess, and the glass run mount is provided with an outer protrusion that engages with the outer engaging recess when the glass run is inserted into the forwardly opening, vertically extending recess.

2. The glass run of claim 1, wherein the soft portion is provided to a portion of the exterior-facing surface of the bent sealing portion except for a base-end portion thereof.

3. The glass run of claim 1, wherein when the window glass is opened, the soft portion makes contact with both the exterior-facing surface of the bent sealing portion and an interior-facing surface of the outboard wall of the forwardly opening, vertically extending recess.

4. The glass run of claim 1, wherein the soft portion is comprised of an elastomeric material which presses the bent sealing portion toward the glass and the bent sealing portion is elastically deformed by the window glass.

* * * * *